(12) United States Patent
Devito et al.

(10) Patent No.: US 10,549,852 B2
(45) Date of Patent: Feb. 4, 2020

(54) ROTATION OF DISENGAGED ROTOR

(71) Applicant: SIKORSKY AIRCRAFT CORPORATION, Stratford, CT (US)

(72) Inventors: Ashley Devito, Newtown, CT (US); Henry E. Voegeli, Newtown, CT (US); Joseph Pantalone, III, Guilford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 456 days.

(21) Appl. No.: 15/324,524

(22) PCT Filed: Jul. 6, 2015

(86) PCT No.: PCT/US2015/039181
§ 371 (c)(1),
(2) Date: Jan. 6, 2017

(87) PCT Pub. No.: WO2016/007403
PCT Pub. Date: Jan. 14, 2016

(65) Prior Publication Data
US 2017/0190417 A1     Jul. 6, 2017

Related U.S. Application Data

(60) Provisional application No. 62/021,818, filed on Jul. 8, 2014.

(51) Int. Cl.
*B64C 27/82*  (2006.01)
*B64C 27/12*  (2006.01)

(52) U.S. Cl.
CPC .............. *B64C 27/82* (2013.01); *B64C 27/12* (2013.01); *B64C 2027/8236* (2013.01)

(58) Field of Classification Search
CPC ........ B64C 27/025; B64C 27/16; B64C 27/18
See application file for complete search history.

(56) References Cited

U.S. PATENT DOCUMENTS

| 3,402,734 A | 9/1968 | Robbins, Jr. |
| 8,210,798 B2 | 7/2012 | Stern |

(Continued)

FOREIGN PATENT DOCUMENTS

EP     2719619 A2    4/2014

OTHER PUBLICATIONS

Extended European Search Report; European Application No. 15819498.5; dated Jan. 22, 2018; 5 Pages.

(Continued)

*Primary Examiner* — Philip J Bonzell
*Assistant Examiner* — Tye William Abell
(74) *Attorney, Agent, or Firm* — Cantor Colburn LLP

(57) ABSTRACT

Embodiments of the invention include a vehicle including an engine and a rotor including a plurality of rotor blades in a path of exhaust from the engine. The vehicle includes a rotor control assembly configured to connect the rotor to a rotation force source to rotate the rotor and configured to rotate the rotor at a prescribed minimum rotation rate greater than zero based on at least one of disengaging the rotor from the rotation force source and receiving a control signal to disengage the rotor from the rotation force source. The rotor control assembly is designed to rotate the rotor at the prescribed minimum rotation rate based on at least one system attribute of the vehicle that is affected by a rotation rate of the rotor.

20 Claims, 6 Drawing Sheets

(56) References Cited

U.S. PATENT DOCUMENTS

| | | | |
|---|---|---|---|
| 8,568,086 B2 | 10/2013 | Keating | |
| 2002/0011539 A1* | 1/2002 | Carter, Jr. | ............... B64C 27/02 244/6 |
| 2005/0178892 A1 | 8/2005 | Box et al. | |
| 2006/0054737 A1 | 3/2006 | Richardson | |
| 2009/0140182 A1 | 6/2009 | Agrawal et al. | |
| 2009/0189011 A1 | 7/2009 | Bahadir | |
| 2010/0044498 A1* | 2/2010 | Palcic | ..................... B64C 27/10 244/17.21 |
| 2010/0198419 A1* | 8/2010 | Sonoda | ................... F01D 17/16 700/290 |
| 2011/0036954 A1* | 2/2011 | Piasecki | .................. B64C 3/385 244/7 A |
| 2013/0134253 A1* | 5/2013 | Carter, Jr. | .................. B64C 27/12 244/17.11 |
| 2014/0191079 A1* | 7/2014 | Ehinger | .................. B64C 27/12 244/17.13 |

OTHER PUBLICATIONS

International Search Report for International Appln. No. PCT/US2015/39181; International Filing Date: Jul. 6, 2015; dated Dec. 29, 2015; 7 pages.

Written Opinion of the International Searching Authority for International Appln. No. PCT/US2015/39181; International Filing Date: Jul. 6, 2015; dated Dec. 29, 2015; 4 pages.

* cited by examiner

ROTATION OF DISENGAGED ROTOR

CROSS REFERENCE TO RELATED APPLICATIONS

This application is a National Stage application of PCT/US2015/039181, filed Jul. 6, 2015, which claims the benefit of U.S. Provisional Application No. 62/021,818, filed Jul. 8, 2014, both of which are incorporated by reference in their entirety herein.

BACKGROUND OF THE INVENTION

Vehicles such as military helicopters may prefer to operate with the tail rotor disengaged to reduce noise or for other operational reasons. However, when a rotor is along a path of a heat source, such as in the path of exhaust from an engine, blades of the rotor are subjected to heat which may exceed heat limits of the materials making up the rotor. As a result, the tail rotor may be compromised when not rotating.

BRIEF DESCRIPTION OF THE INVENTION

Embodiments of the invention relate to a vehicle including an engine, a rotor including a plurality of rotor blades in a path of exhaust from the engine, and a rotor control assembly to control the rotor. The rotor control assembly is configured to connect the rotor to a rotation force source to rotate the rotor and to rotate the rotor at a prescribed minimum rotation rate greater than zero based on at least one of disengaging the rotor from the rotation force source and receiving a control signal to disengage the rotor from the rotation force source. The rotor control assembly is designed to rotate the rotor at the prescribed minimum rotation rate based on at least one system attribute of the vehicle that is affected by a rotation rate of the rotor.

In the above embodiment, or in the alternative, the rotor control assembly may include a clutch to selectively connect the rotor to the rotation force source to drive the rotor, and the rotor control assembly may be configured to generate the prescribed minimum rotation rate by applying a predetermined level of rotational force to the rotor based on the rotor being disengaged by the clutch from the rotation force source.

In the above embodiments, or in the alternative, the clutch may be designed to have an internal resistance sufficient to provide the predetermined level of rotational force to the rotor based on the clutch disengaging the rotor from the rotation force source.

In the above embodiments, or in the alternative, the prescribed minimum rotation rate may be based on a heat tolerance of the rotor.

In the above embodiments, or in the alternative, the prescribed minimum rotation rate may be such that each blade of the rotor is subjected to a level of heat less than a heat tolerance of each blade.

In the above embodiments, or in the alternative, the prescribed minimum rotation rate may be based on a material of the rotor, a size of the rotor, and a portion of the rotor exposed to the exhaust from the engine.

In the above embodiments, or in the alternative, the rotation force source includes a drive shaft, the rotor control assembly may include a gearbox to convert a first rotation rate of the drive shaft to a second rotation rate of the rotor, and the gearbox may include a first gear to drive the rotor based on a command being received from a vehicle controller to engage the clutch and a second gear configured to cause the rotor to rotate at the prescribed minimum rotation rate. The rotor may be engaged with the second gear based on a command being received from the vehicle controller to disconnect the rotor from the rotation force source.

In the above embodiments, or in the alternative, the vehicle may be a helicopter.

In the above embodiments, or in the alternative, a rotation path of the rotor may define a circular planar shape having a flat circular surface, and the rotor may be configured relative to the engine such that the path of exhaust from the engine intersects the flat circular surface of the circular planar shape.

In the above embodiments, or in the alternative, the rotor may be a tail rotor arranged substantially perpendicular to a nose-to-tail axis of the helicopter.

According to another embodiment, a method of fabricating a rotor control assembly includes identifying at least one predetermined system attribute of a rotor system in which a rotor control assembly is to be implemented and identifying a prescribed minimum rotation rate of a rotor controlled by the rotor control assembly necessary to satisfy the at least one predetermined system attribute. The method includes providing at least one rotation-inducing element to the rotor control assembly to cause the rotor control assembly to rotate the rotor at the prescribed minimum rotation rate based on receiving, by the rotor control assembly, a control command to disengage the rotor from a rotation force source.

In the above embodiment, or in the alternative, the at least one predetermined system attribute may include a level of heat directed onto a rotor by engine exhaust.

In the above embodiments, or in the alternative, the prescribed minimum rotation rate may be based on a material of the rotor, a size of the rotor, and a portion of the rotor exposed to the engine exhaust.

In the above embodiments, or in the alternative, a rotation path of the rotor may define a circular planar shape having a flat circular surface, and the rotor may be configured relative to an engine such that a path of exhaust from the engine intersects the flat circular surface of the circular planar shape In the above embodiments, or in the alternative, the at least one rotation-inducing element may be a component in a clutch of the rotor control assembly to cause the clutch to control the rotor to rotate at the prescribed minimum rotation rate when the clutch is in a disengaged state.

In the above embodiments, or in the alternative, the at least one rotation-inducing element may include a lubricating fluid having a prescribed viscosity sufficient to cause the rotor to rotate at the prescribed minimum rotation rate.

In the above embodiments, or in the alternative, the at least one rotation-inducing element may be one or more of a friction pad and a pressure plate configured to maintain contact between a force-supplying and force-receiving side of the clutch to cause the rotor to rotate at the prescribed minimum rotation rate.

In the above embodiments, or in the alternative, the predetermined system attribute may include one or more of an acoustic output level of a system including the rotor control assembly, an electromagnetic signature of the system, a prescribed safety requirement of the system, a level of drag of the system, and an operability of sensors in the system.

In the above embodiments, or in the alternative, the at least one rotation-inducing element may be a component in a gearbox between a rotation force source and the rotor.

In the above embodiments, or in the alternative, the component in the gearbox may be a gear configured to rotate the rotor at the prescribed minimum rotation rate.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

During operation of a rotorcraft, a rotor may be stopped or commanded-to-be-stopped, which may violate system attributes that are required for maximum effectiveness of the system. Embodiments of the invention relate to maintaining a rotor rotating at a minimum prescribed rotation rate based on the rotor being disengaged.

Figure 1:
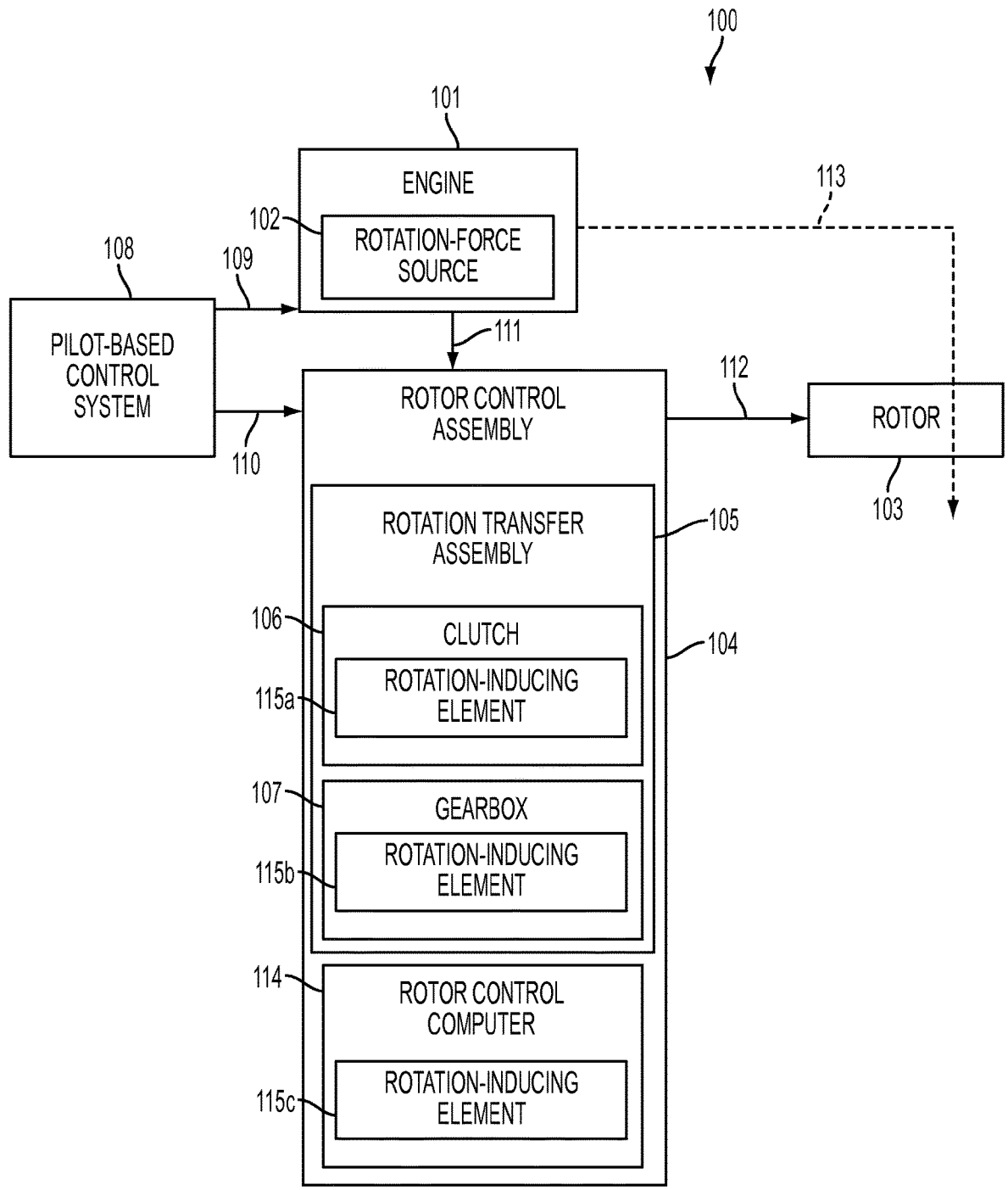
FIG. 1 is a block diagram of a vehicle according to an embodiment of the invention.

FIG. 1 illustrates a block diagram of a vehicle 100 according to an embodiment of the invention. The vehicle 100 includes an engine 101, a rotor 103, such as a tail rotor (controlling a yaw of a vehicle) or tail propulsor rotor (providing propulsion to the vehicle), and a rotor control assembly 104. The engine 101 may be, or may include, a source of rotational force, or a rotation-force source 102 to provide rotational force to the rotor 103 via the rotor control assembly 104. For example, the engine may be a combustion engine that rotates a shaft. The rotor control assembly 104 includes a rotation transfer assembly 105, including a clutch 106 and a gearbox 107. The rotor control assembly 104 selectively engages the clutch 106 to transmit rotation from the rotation force source 102 to the rotor when the clutch 106 is engaged, and to disconnect the rotor 103 from the rotation force source 102 when the clutch 106 is disengaged. In a conventional system, disengaging the clutch 106 results in zero, or as-close-to-zero-as-design-constraints-allow, rotational force being transferred from the rotation-force source 102 to the rotor 103. In addition to engaging and disengaging the rotation-force source 102 from the rotor 103 with the clutch 106, the rotation transfer assembly 105 adjusts a rotation rate of the rotor 103 with the gearbox 107 by connecting the rotation-force source 102 to gears having different dimensions.

In particular, a pilot-based control system 108 controls the engine 101 and the rotor control assembly 104 using control mechanisms 109 and 110. The control mechanisms 109 and 110 may include systems to transmit physical force, such as systems of rods, levers, and other physical mechanisms. The control mechanisms 109 and 110 may also include electrical wires to transmit electrical control signals from a transmitting computer controlled by a pilot to the engine 101 and the rotor control assembly 104. The pilot-based control system 108 may include physical levers, pedals, wheels, and other pilot-controlled mechanisms to actuate physical structures, such as rods, levers, and gears. Alternatively, or in addition to physical force-transfer structures, the pilot-based control system 108 may include a computer that generates electrical signals to control one or both of the engine 101 and rotor control assembly 104, which then provide the physical rotational force to the rotor 103.

The rotation-force source 102 transmits the rotational force to the rotor control assembly 104 via a rotating shaft 111, and the rotor control assembly 104 transmits rotational force to the rotor 103 via the shaft 112. The engine 101 generates exhaust 113, and in the embodiment illustrated in FIG. 1, the rotor 103 is in the path of the exhaust 113, such that the stream of exhaust 113 passes through at least a portion of the round plane (not shown) defined by the rotating rotor 103.

In operation, a pilot generates control commands with the pilot-based control system 108, and the control commands are transmitted to one or both of the engine 101 and the rotor control assembly 104 via the control mechanisms 109 and 110. When the pilot generates a command to disengage the clutch 106, or to disengage the rotation force source 102 from the rotor 103, the rotation transfer assembly 105 provides a prescribed minimum level of rotational force to the rotor 103 based on predetermined system attributes, and in particular, system attributes that are affected by the rotation rate of the rotor 103. For example, the predetermined system attributes may include a safety requirement that the rotor 103 maintain a prescribed rotation rate, an acoustic requirement that the rotor meet certain sound-generating requirements, heat criteria, such as exposing the rotor 103 to no more than a predetermined level of heat from the exhaust 113, drag requirements that the rotor 103 generate no more than a predetermined level of drag on the vehicle 100, electromagnetic requirements that the vehicle 100 generate a predetermined level of electromagnetic radiation, sensor-operation requirements that the rotor 103 rotate at a prescribed rate to allow for correct sensor operation, and other operation requirements based on operation of the vehicle 100, such as maintaining a prescribed rotation rate of the rotor 103 during refueling or other operations performed by the vehicle 100. While some examples of system attributes have been provided, embodiments may include any system attribute that would require that the rotor 103 rotate at a prescribed minimum rotation rate greater than zero.

While FIG. 1 illustrates a rotor control assembly 104 including both a clutch 106 and a gearbox 107, embodiments include systems having only one or the other. For example, in an embodiment in which the rotor control assembly 104 includes only a gearbox 107 and not a clutch 106, the pilot-based control system 108 may control the gearbox 107 via the control mechanism 110, and in some embodiments via the rotor control computer 114, to reduce the rotation rate of the rotor 103.

For example, in one embodiment the rotor 103 may be made of composite materials including layers of carbon, resin, plastics, metals, and other materials, and the heat capacity of the material may represent a heat level at which the composite maintains its integrity, strength, and structure over a predetermined period of time, such as an expected life span of the rotor 103. In embodiments of the invention, the predetermined reduced level of rotational force is greater than zero, but less than a normal operating level of rotational force.

In embodiments, the rotational force to the rotor 103 is reduced instead of eliminated when the clutch 106 is disengaged or when a command is received from the pilot-based control system 108 to disengage the clutch 106. The reduced rotational force has a minimum level based on the predetermined system attributes. In the example embodiment in which the predetermined system attribute includes an exposure of the rotor 103 to the exhaust 113, the materials that make up the rotor have a predetermined heat tolerance or capacity to ensure proper functioning of the rotor 103. The heat tolerance varies according to the particular materials used, and so the minimum rotation rate of the rotor 103 that is applied when the clutch 106 is disengaged varies according to the composition of the rotor 103. Other factors that influence the minimum rotation rate applied when the clutch 106 is disengaged include a size of the rotor 103 or rotor blades, and a portion, fraction, or a percentage of the rotor that is in the path of the engine exhaust 113.

In embodiments of the invention, one or more of the clutch 106, the gearbox 107, and the rotor control computer 114 includes a rotation-inducing element 115a, 115b, or 115c, respectively, to control the clutch 106, gearbox 107, or rotor control computer 114 to control the rotor 103 to rotate at the prescribed minimum rotation rate. Examples of a rotation inducing element 115a in a clutch 106 include lubricating fluid or cooling fluid having a predetermined viscosity sufficient to cause a prescribed rotation to the output of the clutch 106, force-transferring brushes, a force-transferring pressure plate, or any other rotation-inducing element 115a. Examples of a rotation-inducing element 115b in the gearbox 107 include gears, force-transferring brushes, or any other rotation-inducing element 115b. An example of a rotation-inducing element 115c in a rotor control computer 114 is a program or module that receives a command to "disengage" the clutch 106 or gearbox 107, or a command to initiate a particular operation, such as refueling, "stealth mode" operation, running the engine in a non-flight mode, sensor test mode, safety mode, or any other predetermined operating mode, and controls the clutch 106 or gearbox 107 to provide a level of output force to the rotor 103 to cause the rotor 103 to rotate at the prescribed minimum rotation rate rather than entirely disengaging the clutch 106 or gearbox 107, which would result in no rotation of the rotor 103, or as close to no rotation as design constraints would allow.

In one embodiment, the rotor control assembly 104 generates the predetermined reduced level of rotational force by having a clutch 106 with an inherent physical resistance, such that even when the clutch 106 is disengaged, the clutch 106 transmits a reduced level of rotational force to the rotor 103 that is greater than zero but less than when the clutch 106 is engaged. In another embodiment, when the pilot-based control system 108 generates a command to disengage the clutch 106, the clutch 106 remains engaged, but the gearbox 107 is controlled to drive the rotor 103 at a predetermined minimum turn ratio that is less than the normal turn ratio. In yet another embodiment, the pilot-based control system 108 receives a user input to disengage the clutch 106, and the pilot-based control system 108 instead generates the command to maintain the clutch 106 engaged, but to rotate the rotor 103 at a predetermined reduced rotation rate using the gearbox 107. In such an embodiment, the rotor control assembly 104 may include a rotor control computer 114 that receives one command from the pilot-based control system 108 and converts the command to different control signals to provide the minimum rotation rate greater than zero to the rotor 103. For example, a command to disengage the clutch 106 may be provided to the rotor control computer 114, and the rotor control computer 114 may instead generate control signals to provide the minimum rotation rate greater than zero to the rotor 103.

In yet another embodiment, the pilot-based control system 108 receives a user command to reduce a rotation of the rotor 103 to a minimum rotation level instead of entirely disengaging the clutch 106. In other words, in some embodiments, the rotor control assembly 104 provides a minimum rotation rate greater than zero when the clutch 106 is disengaged, or when a command is given by a user or the pilot-based control system 108 to disengage the clutch 106, and in other embodiments, the command from the pilot-based control system 108 is not to disengage the clutch 106 but rather to rotate the rotor 103 at a minimum rotation rate. In yet another embodiment, the gearbox 107 includes no clutch, and instead the pilot-based control system 108 receives a user command to reduce the rotation of the rotor 103 to a minimum rotor speed, which may correspond to a "quiet" mode, "safe" mode, or any other mode in which full power to the rotor 103 is not required or desired. In such an embodiment, the gearbox 107 is controlled to maintain rotation of the rotor 103 at the predetermined reduced rotation rate.

In yet another embodiment, one or both of the pilot-based control system 108 and the rotor control assembly 104 controls the rotation transfer assembly 105 to intermittently engage and disengage the clutch 106 to provide the minimum rotation rate to the rotor 103 based on the predetermined system attribute. In such an embodiment, the rotor control assembly 104 may include a rotor control computer 114 that receives a command from the pilot-based control system 108.

In one embodiment, one or both of the pilot-based control system 108 and the rotor control assembly 104 detects whether the engine 101 is running, or running at a predetermined power level corresponding to exhaust at a predetermined temperature, and controls the rotation rate of the rotor 103 to always be at the prescribed minimum rotation rate greater than zero, or above, while the engine 101 is running, even when commands are received to disengage the clutch 106 or halt the rotor 103. Of course, in some embodiments, over-ride controls may be provided to completely stop rotational force to the rotor 103 or to allow the rotor 103 to rotate less than a prescribed minimum rotation rate to subject rotor blades to heat levels that exceed the heat capacity of the rotor 103. For example, a drastic noise reduction may be required for security purposes for a limited time, or testing may be required for a limited time, and the prescribed minimum rotation of the rotor 103 may be over-ridden for the limited time.

In addition, if the engine 101 is off, turning off, or below a predetermined power level, one or both of the pilot-based control system 108 and the rotor control assembly 104 may allow the rotor 103 to be completely stopped, to not receive a rotational force from the rotor control assembly 104, or to fall below the minimum rotation rate of the rotor 103 based on commands to stop rotation of the rotor 103. For example, in an embodiment in which the rotation-inducing element is a physical contact between a rotation-force input component of the clutch 106 or gearbox 107 and a rotation-force output component of the clutch 106 or gearbox 107, the lack of a rotation-force input, or the rotation of the rotation-force source at a rate less than the prescribed minimum rotation rate, may cause the rotor 103 to rotate at a rate less than the prescribed minimum rotation rate.

Figure 2:
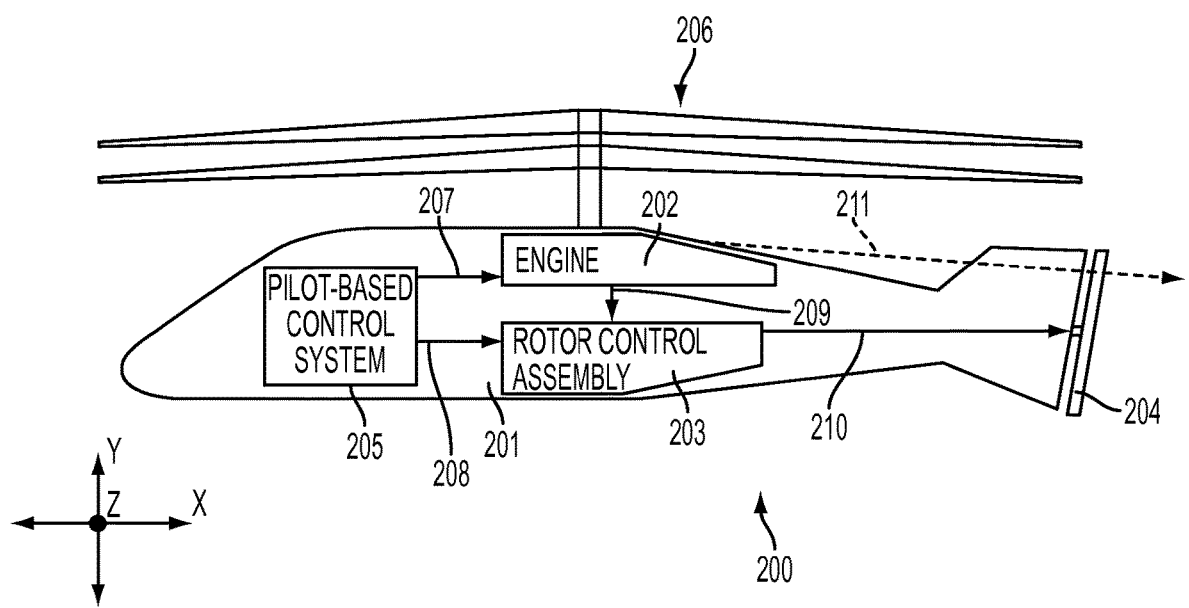
FIG. 2 is a diagram of a helicopter according to an embodiment of the invention.

FIG. 2 illustrates an embodiment in which the vehicle 100 of FIG. 1 is a helicopter 200. As illustrated in FIG. 2, the helicopter 200 includes a body 201, an engine 202 in the body, corresponding to the engine 101 of FIG. 1, a rotor control assembly 203 in the body 201 corresponding to the rotor control assembly 104 of FIG. 1, and a pilot-based control system 205 in the body 201 corresponding to the pilot-based control system 108 of FIG. 1. The helicopter 200 includes control mechanisms 207 and 208 to control the engine 202 and rotor control assembly 203, a shaft 209 to provide rotational force from the engine 202 to the rotor control assembly 203, and a shaft 210 to provide rotational force from the rotor control assembly 203 to a tail rotor 204. In the embodiment illustrated in FIG. 2, the helicopter 200 includes a dual-rotor assembly 206, and the tail rotor 204 is arranged substantially along a plane defined by axes Y (height of the helicopter 200), and Z (width of the helicopter), perpendicular to the X axis (nose-to-tail length of the helicopter 200). However, embodiments also encompass tail rotors arranged substantially along the X-Y plane, or any other plane intersected by engine exhaust 211. In the embodiment illustrated in FIG. 2, the engine exhaust 211 intersects the plane of the rotor 204 (the Y-Z plane), but embodiments also encompass engine exhaust 211 that is directed along, or parallel to, the plane of the rotor 204, such as in a single-main-rotor helicopter.

Figure 3:
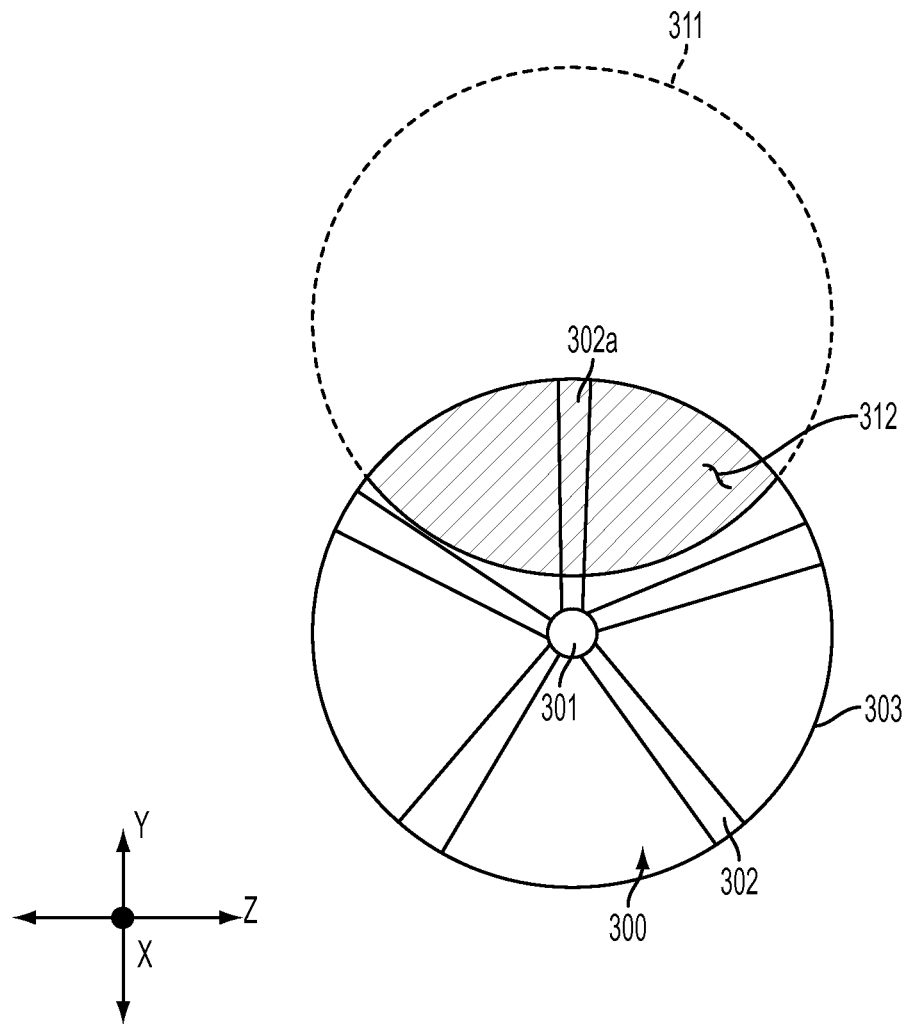
FIG. 3 is a diagram of a rotor according to an embodiment of the invention.

FIG. 3 illustrates an intersection of exhaust 311 and a rotor 300 according to an embodiment of the invention. Referring to FIG. 3, the rotor 300 includes a shaft 301 and blades 302. The rotation of the blades 302 defines a circular planar shape 303. In the embodiment of FIG. 3, the circular planar shape is along the Y-Z axis or in the Y-Z plane, perpendicular to the nose-to-tail length along the X axis. Accordingly, the rotor 300 may be a propulsor rotor that is configured to provide forward and reverse propulsion to a vehicle. The exhaust 311 from the engine is represented by dashed lines, and intersects the rotor 300, or the plane defined by the rotation of the blades 302, in the region 312. As illustrated in FIGS. 2 and 3, one blade 302a would be subjected to constant heat from the exhaust 311 were the rotation of the rotor 300 to be stopped. Accordingly, embodiments of the invention relate to rotating the rotor 300 at a predetermined reduced rotation rate when the engine is running and generating exhaust 311, to prevent the blades 302 of the rotor 300 from being subjected to a level of heat greater than a heat tolerance of a material that makes up the blades 302.

Figure 4:
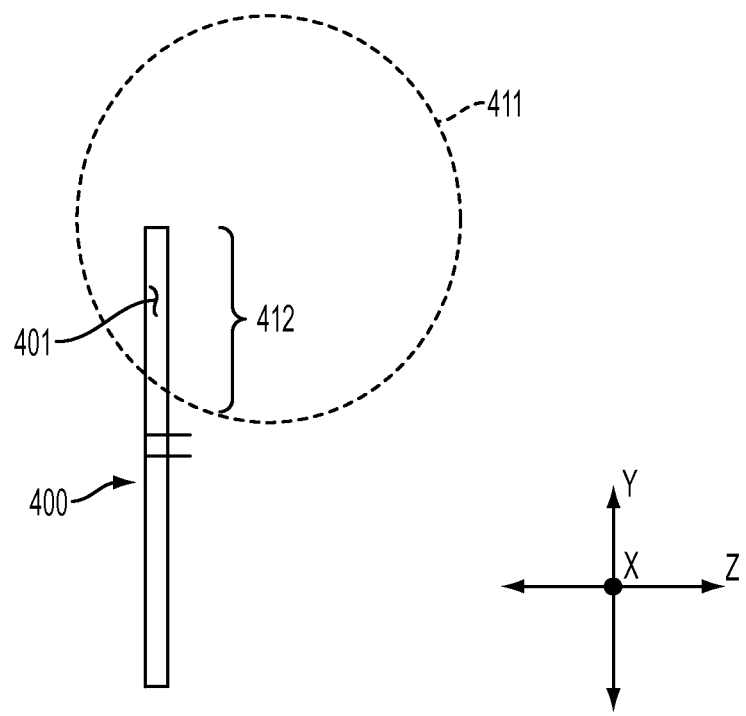
FIG. 4 is a diagram of a rotor according to another embodiment of the invention.

FIG. 4 illustrates an intersection of exhaust 411 with a rotor 400 according to another embodiment of the invention. In contrast to FIG. 3, the rotor 400 of FIG. 4 rotates along the X-Y axis or in the X-Y plane. Accordingly, the rotor 400 may be a tail rotor of a conventional rotary-wing aircraft that adjusts a yaw of the aircraft, for example. However, like the embodiment of FIG. 3, the exhaust 411 intersects a region 412 of the rotor 400, such that if the rotor 400 stopped rotating, only the blades in the region 412 would be subjected to the heat from the exhaust 411. Accordingly, as discussed above, embodiments of the invention relate to rotating the rotor 400 at a predetermined reduced rotation rate when the engine is running and generating exhaust 411, to prevent the blades of the rotor 400 from being subjected to a level of heat greater than a heat tolerance of a material that makes up the blades of the rotor 400.

Figure 5:
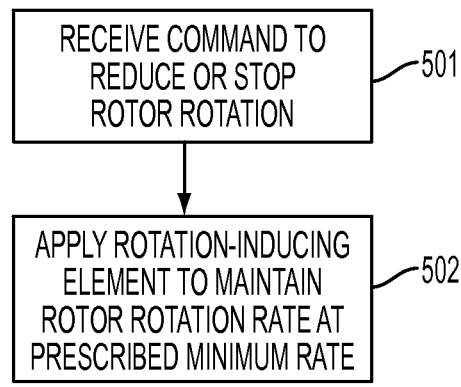
FIG. 5 is a flow diagram of a method of controlling a rotor according to an embodiment of the invention.

FIG. 5 is a flow diagram of a method of controlling a rotor according to an embodiment of the invention. In block 501, a command is received to stop a rotor rotation, or to reduce a rotor rotation to perform a particular operation of a vehicle. In a conventional system without rotation-inducing elements according to embodiments of the invention, the command may be one that would have reduced a rotor rotation below a predetermined threshold. The command may be the actuation of physical pilot devices, such as pedals, levers, and rods, by a pilot, the generation of electrical commands by a computer, or any other type of control mechanism to control the operation of a rotor. In one embodiment, the command is a command to disengage a clutch, or in other words to disengage a rotor from a rotational force source. In another embodiment, the command is a command to reduce the rotation rate of the rotor beneath a threshold.

In block 502, a rotation-inducing element is applied to a rotor control assembly to maintain the rotation rate of the rotor at or above a prescribed minimum rotation rate. In one embodiment, a fixed predetermined minimum rotation rate is applied to the tail rotor, regardless of the current state of a system attribute, such as the temperature of the engine exhaust at any given time. For example, in an embodiment in which a predetermined resistance is built into a clutch of a rotor control assembly, or into a gearbox connected to the rotor, the resistance of the clutch could not be adjusted. In another embodiment, the minimum rotation rate of the rotor may be adjusted according to the temperature of the exhaust, such that the minimum rotation rate may be less when the exhaust is cooler, and would be more when the exhaust is hotter. In such an embodiment, command signals may control the gear ratios applied to the tail rotor, pulses of varying durations may be applied to a clutch to adjust the rotation rate of the rotor, or any other manner of varying the rotation rate of the rotor may be utilized. In an embodiment in which pulses are applied to the clutch, the clutch may be engaged and disengaged at predetermined intervals to result in a predetermined rotation rate, rather than maintaining the clutch in an engaged state.

Figure 6:
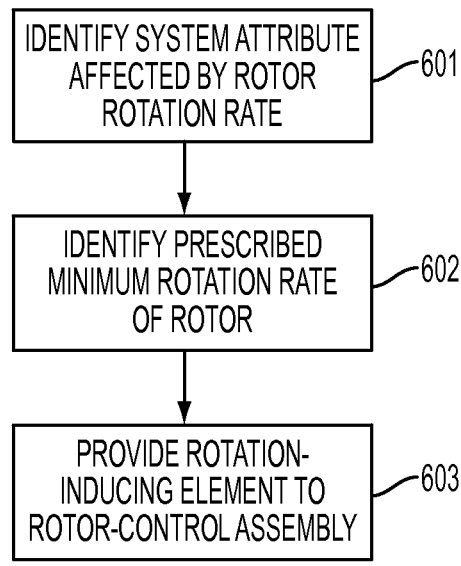
FIG. 6 is a flow diagram of a method of fabricating a rotor-control assembly according to an embodiment of the invention.

FIG. 6 is a flow diagram of a method of fabricating a rotor control assembly according to an embodiment of the invention. In block 601, a system attribute affected by a rotor rotation rate is identified. Examples of system attributes include safety requirements that a rotor maintain a prescribed rotation rate, acoustic requirements that the rotor meet certain sound-generating requirements (such as generating noise below a predetermined level), heat criteria, such as exposing each rotor blade to no more than a predetermined level of heat from engine exhaust, drag requirements that the rotor generate no more than a predetermined level of drag, electromagnetic requirements that a vehicle generate a predetermined level of electromagnetic radiation, sensor-operation requirements that the rotor rotate at a prescribed rate to allow for correct sensor operation, and other operation requirements based on operation of a vehicle, such as maintaining a prescribed rotation rate of the rotor during a refueling operation of the vehicle, operating in a low-noise or stealth mode, or other operations performed by the vehicle.

In block 602, a prescribed minimum rotation rate is identified based on the system attributes. For example, if a system attribute includes exposing rotor blades to a level of heat less than a predetermined level, then the prescribed minimum rotation rate is identified at which the rotor blades would be exposed to a level of heat less than the predetermined level. As another example, if the system attribute includes generating noise below a predetermined level, the prescribed rotation rate may be a rate that would maintain the rotor at or below the predetermined noise level. According to yet another example, if the system attribute includes generating less than a predetermined level of drag, the prescribed rotation rate may be a rate that would generate less than the predetermined level of drag.

In block 603, a rotation-inducing element is provided to the rotor-control assembly to cause the rotor-control assembly to rotate the rotor at the prescribed minimum rotation rate. Examples of rotation-inducing elements include friction-generating brushes or pressure plates, lubricant or coolant having a predetermined viscosity, gears of a gearbox of predetermined sizes, and in the case of a rotor-control computer, a module that generates rotor control signals to control the rotor to rotate at the prescribed minimum rate.

Figure 7A:
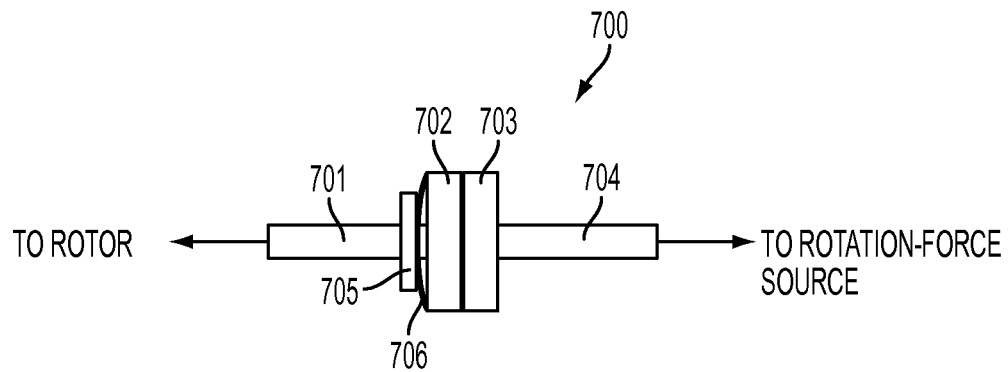
FIG. 7A is a block diagram of a clutch assembly according to an embodiment of the invention.
Figure 7B:
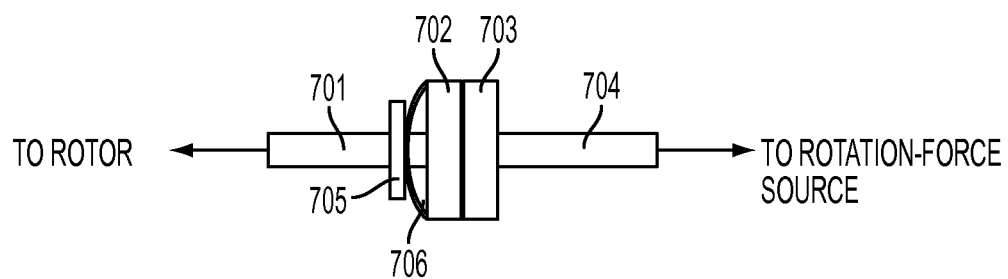
FIG. 7B is a block diagram of a clutch assembly according to an embodiment of the invention.
Figure 8:
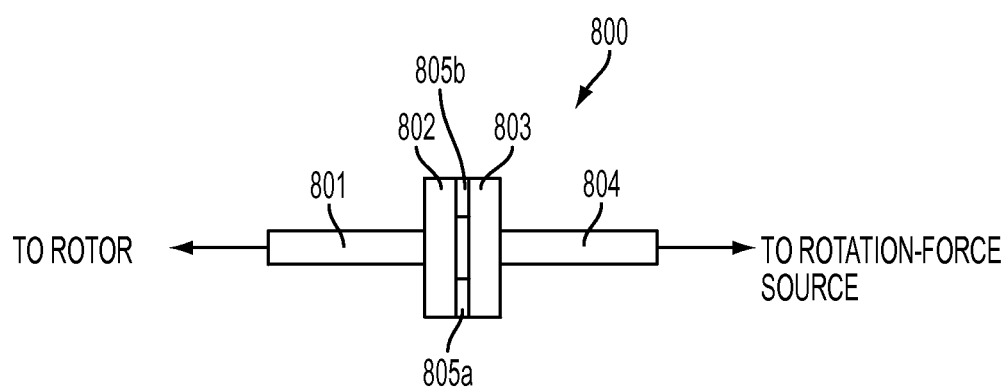
FIG. 8 is a block diagram of a clutch assembly according to another embodiment of the invention.

FIGS. 7A, 7B, and 8 illustrate example embodiments of clutch assemblies and rotation-inducing elements. It is understood that FIGS. 7A, 7B, and 8 illustrate block diagrams of clutch assemblies for purposes of description, and actual clutch assemblies may include additional and different components and configurations.

FIGS. 7A and 7B illustrate a block diagram of a clutch assembly 700 according to an embodiment of the invention. The clutch assembly 700 includes a shaft 701 connected to a rotor, a first clutch plate 702, a second clutch plate 703, and a shaft 704 connected to a rotation-force source. The assembly 700 includes a pressure-receiving element 705 and pressure plate 706. In the clutch "engaged" state, illustrated in FIG. 7A, the force-receiving plate 705 is pressed towards the first plate 702, pressing the pressure plate 706 firmly against the first plate 702 to engage the first plate 702 firmly with the second plate 703. Accordingly, the rotation rate of the first shaft 701 is at or near the rotation rate of the second shaft 704.

In the "disengaged" state illustrated in FIG. 7B, the force-receiving plate 705 has less force, or no force, applied in the direction of the first plate 702, and so the pressure plate 706 exerts less force against the first plate 702 and the first plate 702 exerts less force against the second plate 703. Accordingly, the first plate 702 rotates at a rate less than in FIG. 7A. In embodiments of the invention, the level of pressure exerted by the pressure plate 706 against the first plate 702 in the "disengaged" state illustrated in FIG. 7B may be sufficient to rotate the shaft 701 and a connected rotor at a prescribed minimum rotation rate greater than zero according to a predetermined system attribute.

FIG. 8 illustrates a clutch assembly 800 including rotation-inducing elements 805a and 805b between the first and second plates 802 and 803 of the clutch assembly 800. In particular, the assembly 800 includes a first shaft 801 connected to a rotor, a first plate 802 connected to the first shaft 801, a second shaft 804 connected to a rotation-force source, and a second plate 803 connected to the second shaft 804. In operation, when the clutch assembly 800 is engaged, the first plate 802 is pressed towards the second plate 803, and when the clutch assembly 800 is disengaged, the first plate 802 is brought away from the second plate 803. In embodiments of the invention, the rotation-inducing elements 805a and 805b, which may include, for example, pads, brushes, a compressible disc, lubricating fluid, or any other rotation-inducing element, maintain a degree of contact between the first plate 802 and the second plate 803 when the first plate 802 is brought away from the second plate 803 to keep the second shaft 804 rotating at the prescribed minimum rotation rate.

Embodiments of the invention relate to maintaining at least a prescribed minimum rotation rate of a rotor when a rotor-control assembly disengages the rotor from a rotation-force source. Technical benefits of embodiments of the invention include the prevention of damage to rotors that are in the path of heat sources, such as engine exhaust, by rotating the rotor at at least a minimum rotation rate to alternate blades of the rotor exposed to the engine exhaust, maintaining minimum safety levels, and maintaining minimum sound or drag levels.

A technical effect achieved by embodiments of the invention is the reduction of thermal impingement on tail rotors.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A vehicle, comprising:
   an engine;
   a rotor, comprising a plurality of rotor blades, in a path of exhaust from the engine; and
   a rotor control assembly including a clutch configured to selectively connect the rotor to a rotation force source to rotate the rotor, the rotor control assembly being configured to rotate the rotor at a prescribed minimum rotation rate greater than zero in response to at least one of disengaging the rotor from the rotation force source and receiving a control signal to disengage the rotor from the rotation force source, the prescribed minimum rotation rate being determined based on at least one system attribute of the vehicle that is affected by a rotation rate of the rotor, the at least one system attribute being associated with exposure of the rotor to exhaust output from the engine.

2. The vehicle of claim 1, wherein the rotation force source includes a drive shaft,
   the rotor control assembly includes a gearbox to convert a first rotation rate of the drive shaft to a second rotation rate of the rotor, and
   the gearbox includes a first gear to drive the rotor based on a command being received from a vehicle controller to engage the clutch, and the gearbox includes a second gear configured to cause the rotor to rotate at the prescribed minimum rotation rate, the rotor being engaged with the second gear based on a command being received from the vehicle controller to disconnect the rotor from the rotation force source.

3. The vehicle of claim 1, wherein
   the rotor control assembly is configured to rotate the rotor at the prescribed minimum rotation rate by applying a predetermined level of rotational force to the rotor when the clutch is disengaged from the rotation force source.

4. The vehicle of claim 3, wherein the clutch includes an internal resistance such that when the clutch is disengaged, the clutch transmits the predetermined level of rotational force to the rotor.

5. The vehicle of claim 1, wherein the prescribed minimum rotation rate is based on a heat tolerance of the rotor.

6. The vehicle of claim 5, wherein the prescribed minimum rotation rate is such that each blade of the rotor is subjected to a level of heat less than a heat tolerance of each blade.

7. The vehicle of claim 6, wherein the prescribed minimum rotation rate is based on a material of the rotor, a size of the rotor, and a portion of the rotor exposed to the exhaust from the engine.

8. The vehicle of claim 1, wherein the vehicle is a helicopter.

9. The vehicle of claim 8, wherein a rotation path of the rotor defines a circular planar shape having a flat circular surface, and the rotor is configured relative to the engine such that the path of exhaust from the engine intersects the flat circular surface of the circular planar shape.

10. The vehicle of claim 8, wherein the rotor is a tail rotor arranged substantially perpendicular to a nose-to-tail axis of the helicopter.

11. A method of fabricating a rotor control assembly, comprising:

identifying at least one predetermined system attribute of a rotor system in which a rotor control assembly is to be implemented, the at least one predetermined system attribute being associated with exposure of a rotor to exhaust output from an engine;

identifying a prescribed minimum rotation rate of the rotor controlled by the rotor control assembly in response to the at least one predetermined system attribute; and providing at least one rotation-inducing element to the rotor control assembly to cause the rotor control assembly to rotate the rotor at the prescribed minimum rotation rate to implement the at least one predetermined system attribute in response to receiving, by the rotor control assembly, a control command to disengage the rotor from a rotation force source.

12. The method of claim 11, wherein the predetermined system attribute includes one or more of an acoustic output level of a system including the rotor control assembly, an electromagnetic signature of the system, a prescribed safety requirement of the system, a level of drag of the system, and an operability of sensors in the system.

13. The method of claim 11, wherein the at least one rotation-inducing element is associated with a gearbox located between a rotation force source and the rotor.

14. The method of claim 13, wherein the at least one rotation-inducing element associated with the gearbox includes a gear configured to rotate the rotor at the prescribed minimum rotation rate.

15. The method of claim 11, wherein the at least one predetermined system attribute includes a level of heat directed onto the rotor by the engine exhaust.

16. The method of claim 15, wherein the prescribed minimum rotation rate is based on a material of the rotor, a size of the rotor, and a portion of the rotor exposed to the engine exhaust.

17. The method of claim 15, wherein a rotation path of the rotor defines a circular planar shape having a flat circular surface, and the rotor is configured relative to an engine such that a path of exhaust from the engine intersects the flat circular surface of the circular planar shape.

18. The method of claim 11, wherein the at least one rotation-inducing element is associated with a clutch of the rotor control assembly and is operable to cause the clutch to control the rotor to rotate at the prescribed minimum rotation rate when the clutch is in a disengaged state.

19. The method of claim 18, wherein the at least one rotation-inducing element includes a lubricating fluid having a prescribed viscosity sufficient to cause the rotor to rotate at the prescribed minimum rotation rate.

20. The method of claim 18, wherein the at least one rotation-inducing element includes a force-transferring component operable to cause the rotor to rotate at the prescribed minimum rotation rate.

* * * * *